(12) United States Patent
Matsuo (10) Patent No.: US 7,641,292 B2
(45) Date of Patent: Jan. 5, 2010

(54) STRUCTURE OF CORELESS CRAWLER

(75) Inventor: Shuichi Matsuo, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 174 days.

(21) Appl. No.: 11/665,771

(22) PCT Filed: Oct. 20, 2005

(86) PCT No.: PCT/JP2005/019274

§ 371 (c)(1),
(2), (4) Date: Jun. 14, 2007

(87) PCT Pub. No.: WO2006/043616

PCT Pub. Date: Apr. 27, 2006

(65) Prior Publication Data

US 2008/0164755 A1  Jul. 10, 2008

(30) Foreign Application Priority Data

Oct. 20, 2004 (JP) .............................. 2004-305995

(51) Int. Cl.
*B62D 55/24* (2006.01)
(52) U.S. Cl. ...................... 305/166; 305/167
(58) Field of Classification Search ................ 305/157, 305/160, 165, 166, 167, 170, 178, 179
See application file for complete search history.

(56) References Cited

U.S. PATENT DOCUMENTS

| | | | | |
|---|---|---|---|---|
| 2,476,828 A | * | 7/1949 | Skromme | 305/170 |
| 3,480,339 A | * | 11/1969 | Kell | 305/166 |
| 3,712,689 A | * | 1/1973 | Chaumont | 305/166 |
| 3,754,798 A | * | 8/1973 | Chaumont | 305/166 |
| 3,858,948 A | * | 1/1975 | Johnson et al. | 305/178 |
| 3,917,360 A | * | 11/1975 | Gregoire | 305/168 |
| 4,269,459 A | * | 5/1981 | Peck | 384/135 |
| 5,533,796 A | * | 7/1996 | Beeley | 305/188 |
| 6,536,852 B2 | * | 3/2003 | Katayama et al. | 305/170 |
| 6,942,305 B2 | * | 9/2005 | Ueno | 305/167 |
| 6,974,196 B2 | * | 12/2005 | Gagne et al. | 305/166 |
| 7,083,242 B2 | * | 8/2006 | Piou et al. | 305/167 |
| 7,325,888 B2 | * | 2/2008 | Fujita et al. | 305/167 |

FOREIGN PATENT DOCUMENTS

| | | | |
|---|---|---|---|
| EP | 589040 A1 | * | 3/1994 |
| JP | 62-265080 A | | 11/1987 |
| JP | 05170148 A | * | 7/1993 |

(Continued)

*Primary Examiner*—Russell D Stormer
(74) *Attorney, Agent, or Firm*—Sughrue Mion, PLLC (57) ABSTRACT

A structure of a coreless crawler comprising: main cords that are embedded in rows in a longitudinal direction of the crawler, two layers of bias cords (a, b) that are embedded at an outer peripheral side of the main cords, bias cords (c) that are laid perpendicular to the main cords and embedded at an inner peripheral side of the main cords, rubber protrusions that are formed at constant intervals at a central portion on an inner peripheral surface of the crawler, and rubber lugs that are formed on an outer peripheral surface of the crawler, wherein the bias cords (a, b, c) and the main cords are held between treatment rubbers, and a rubber layer having lower hardness than treatment rubber is interposed between the main cords and the bias cords (c).

6 Claims, 8 Drawing Sheets

FOREIGN PATENT DOCUMENTS

| | | | |
|---|---|---|---|
| JP | 06144310 A * | 5/1994 | |
| JP | 2001-278137 A | 10/2001 | |
| JP | 2002-19654 A | 1/2002 | |
| JP | 2002-166862 A | 6/2002 | |
| JP | 2003-182661 A | 7/2003 | |

* cited by examiner

STRUCTURE OF CORELESS CRAWLER

TECHNICAL FIELD

The present invention relates to a structure of a coreless crawler and aims to prolong the life of the crawler.

BACKGROUND ART

Figure 1:
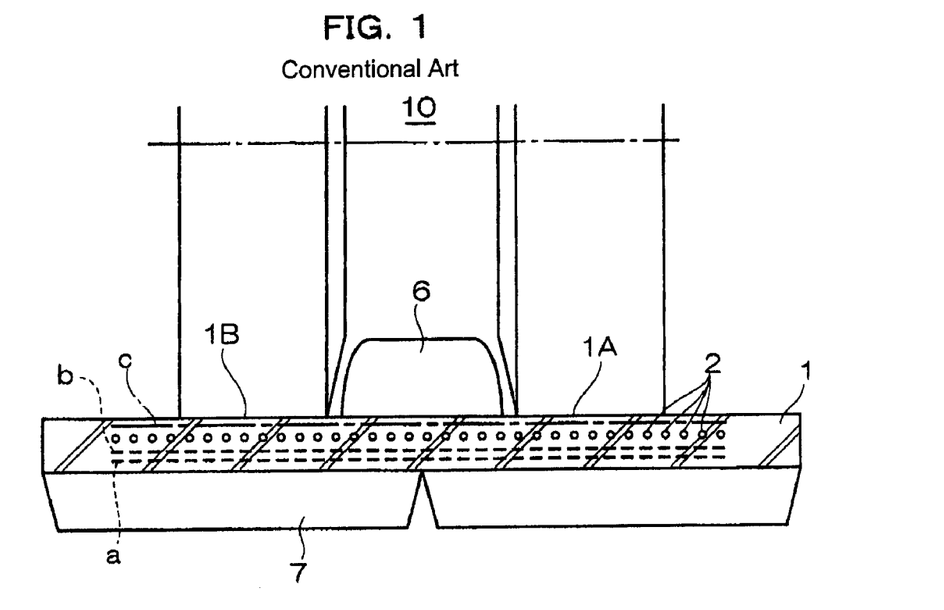
FIG. 1 is a cross-sectional view of a conventional crawler.

FIG. 1 is a cross-sectional view showing a structure of a coreless crawler 1 having such a structure as follows:

Main cords 2 are embedded in rows in a longitudinal direction of the crawler 1. Two layers of bias cords (a, b) are embedded at an outer peripheral side of the main cords 2, and bias cords (c) are embedded at an inner peripheral side of the main cords 2. Rubber protrusions 6 are formed at constant intervals at a central portion on an inner peripheral surface of the crawler 1, and are subject to driving forces from sprockets. Rubber lugs 7 are formed on an outer peripheral surface of the crawler 1.

In molding a crawler, the bias cords (a, b, c) and the main cords 2 are not simply disposed as they are in a mold. Instead, they are held from above and bottom between unvulcanized rubber sheets, i.e., so-called "treatment rubbers", and formed into a belt shape. Then, they are stacked in the mold to mold a crawler.

The bias cords (a, b) form inverse angles at about 35 degrees with respect to the main cords 2, and the bias cords (c) are laid approximately perpendicular to the main cords 2. By these cords, lateral rigidity of the crawler is improved, rubber cracking due to an outer force is prevented, and rubber cracking is halted at positions of the bias cords even if rubber cracking occurs to thereby prevent rubber cracking from affecting the main cords.

However, since inner peripheral surfaces 1A and 1B in left and right width directions of the rubber protrusions 6 are rolling surfaces of track rollers, the inner peripheral surfaces 1A and 1B are subject to repetitive compressions or strains, and accordingly, the bias cords (c) at the inner peripheral side of the main cords may be broken. When the bias cords (c) are broken, stripping-off of rubber may occur with the broken portion of the bias cords (c) as a start point. Further, chipping of rubber, rusting of main cords resulting from stripping or chipping or the like may occur. Accordingly, life of the crawler may be considerably shortened.

SUMMARY OF THE INVENTION

An object of the present invention is to provide a coreless crawler which can reduce the breakage occurring of the bias cords at the inner peripheral side of the main cords due to the track rollers rolling.

Means for Solving the Problems

The summary of the invention is a structure of a coreless crawler comprising main cords that are embedded in rows in a longitudinal direction of the crawler, two layers of bias cords (a, b) that form inverse angles at left and right sides with respect to the main cords and are embedded at an outer peripheral side of the main cords, bias cords (c) that are laid perpendicular to the main cords and embedded at an inner peripheral side of the main cords, rubber protrusions that are formed at constant intervals at a central portion on an inner peripheral surface of the crawler, and rubber lugs that are formed on an outer peripheral surface of the crawler, wherein the bias cords (a, b, c) and the main cords are respectively held between treatment rubbers, and a rubber layer having lower hardness than the treatment rubbers is interposed between the main cords and the bias cords (c) so as to be provided at least at rolling surface portions of track rollers in left and right width directions of the rubber protrusions, as seen from a plan view of the crawler. Hardness of the rubber layer interposed between the main cords and the bias cords (c) is preferably 55 to 70 degrees.

EFFECT OF THE INVENTION

Since the present invention is structured as described above, during the use of the crawler, even if the track rollers roll on the left and right widthwise portions of the rubber protrusions 6, the bias cords (c) are not broken, whereby cracking or chipping of rubber due to breakage of the bias cords (c), and rusting or cutting of the main cords resulting from cracking or chipping of the rubber can be prevented.

BEST MODE FOR CARRYING OUT THE INVENTION

In a conventional art, in order to improve the rigidity of a crawler, there has been an idea in which bias cords (c) are embedded at an inner peripheral side of the crawler such that a width at which the bias cords (c) are embedded is almost the same as a total width at which the main cords are embedded. However, in this conventional method, there always exist the bias cords (c) at rolling surface side of track rollers, loads are always applied from a vehicle to the bias cords (c), and strain is also applied thereto during a turn of the vehicle and the like. Accordingly, the bias cords (c) may be broken.

Figure 2:
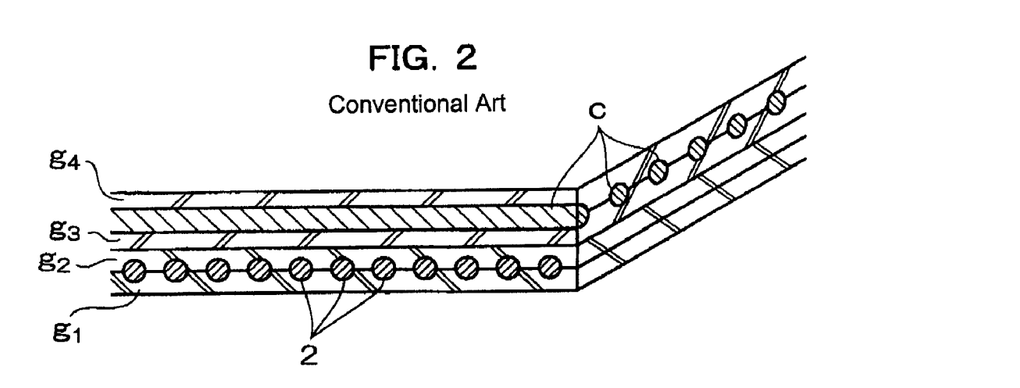
FIG. 2 is a detail view between main cords and bias cords (c) before vulcanized in the conventional crawler.

FIG. 2 is a detail view between the main cords 2 and the bias cords (c) of a conventional crawler. The main cords 2 are held from above and below between unvulcanized rubbers (treatment rubbers) g1 and g2, and formed into a belt shape, and the bias cords (c) are also held between unvulcanized rubbers (treatment rubbers) g3 and g4, and formed into a belt shape. They thus are stacked and vulcanized, and the main cords 2 and the bias cords (c) are finally surrounded at the peripheries thereof by rubber having higher hardness.

As a result of an intensive study of the situation of breakage of the bias cords (c), it is turned out that the bias cords (c) are broken mainly at positions corresponding to the end edge portions of the track rollers because hardness of treatment rubbers holding the bias cords (c) and the main cords 2 therebetween is comparatively high, and the bias cords (c) in this treatment rubbers having higher hardness are largely strained, and behavior of the bias cords (c) is restricted.

An example of the present invention provides a crawler in which a rubber layer having lower hardness than treatment rubber is interposed into higher hardness rubbers holding the bias cords (c) and the main cords therebetween so as to be provided at least at rolling surfaces of track rollers in left and right width directions of the rubber protrusions, as seen from a plan view of the crawler. Thus, strain applied to both the bias cords (c) and the higher hardness rubber layer covering the bias cords (c) mainly due to rolling of the track rollers is absorbed by the lower hardness rubber layer, whereby occurrences of breakage on the bias cords (c) can be reduced.

The bias cords (c) and the main cords are respectively held from above and below between unvulcanized rubbers. When the unvulcanized rubbers are vulcanized, ordinary hardness thereof is in a range of 70 to 85 degrees (JIS•A). An example of the present invention is structured to interpose the lower hardness rubber layer between the rubbers holding the bias cords (c) and the main cords therebetween. It suffices as long as a lower hardness rubber layer is embedded whose hardness is 50 to 70 degrees, preferably 55 to 65 degrees (JIS•A), and whose thickness is about 2 to 4 mm.

Example 1

With reference to an example, a detailed description of the invention will be made, hereinafter.

Figure 3:
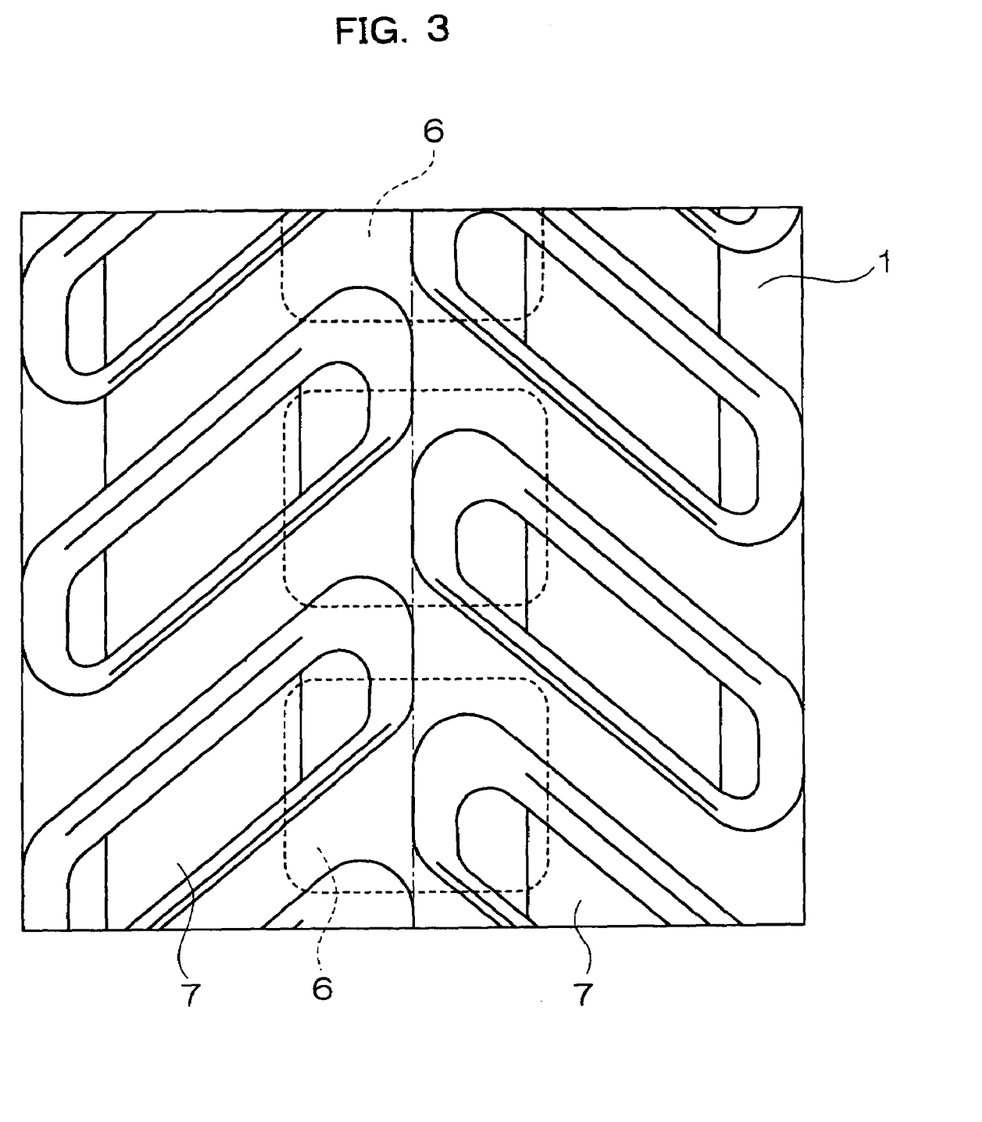
FIG. 3 is a plan view of a crawler of a present example at an outer peripheral side thereof.
Figure 4:
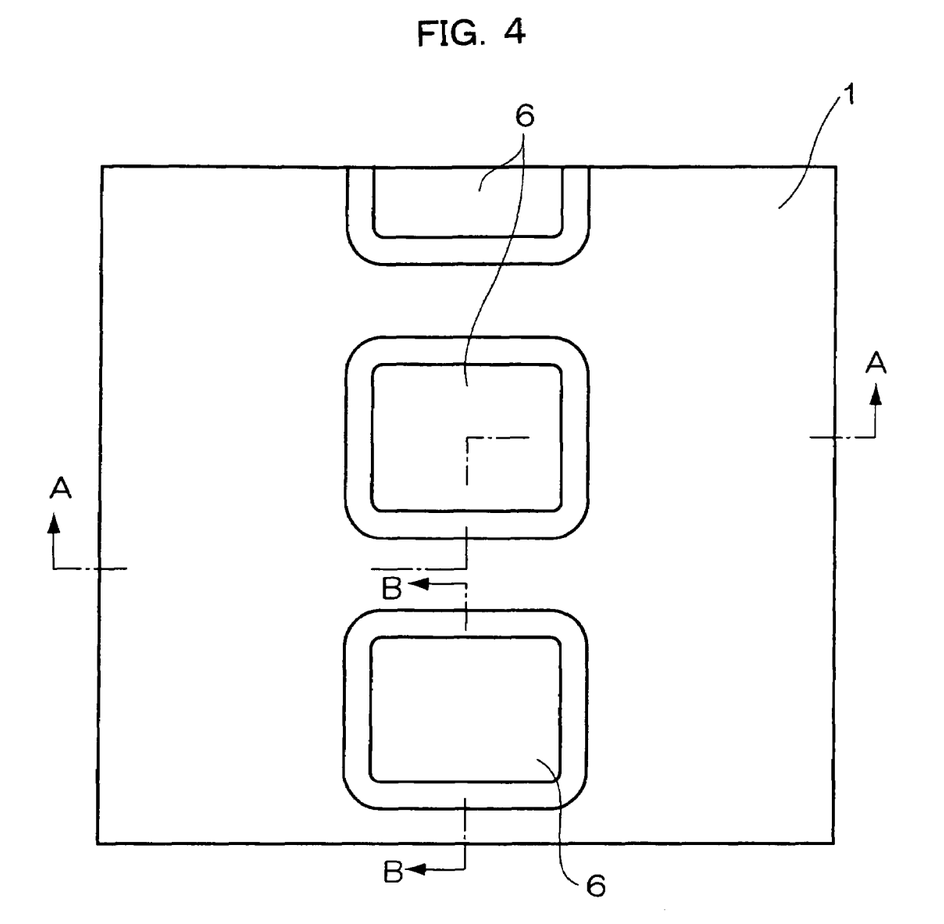
FIG. 4 is a plan view of a crawler of a present example at an inner peripheral side thereof.
Figure 5:
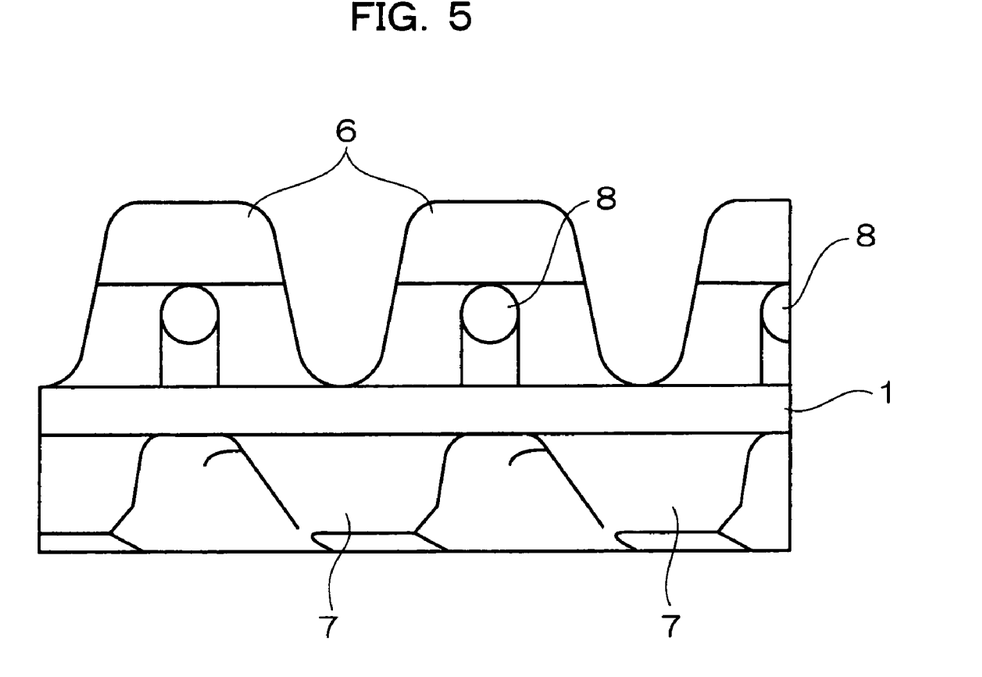
FIG. 5 is a side view of a crawler in Example 1 of the present invention.
Figure 6:
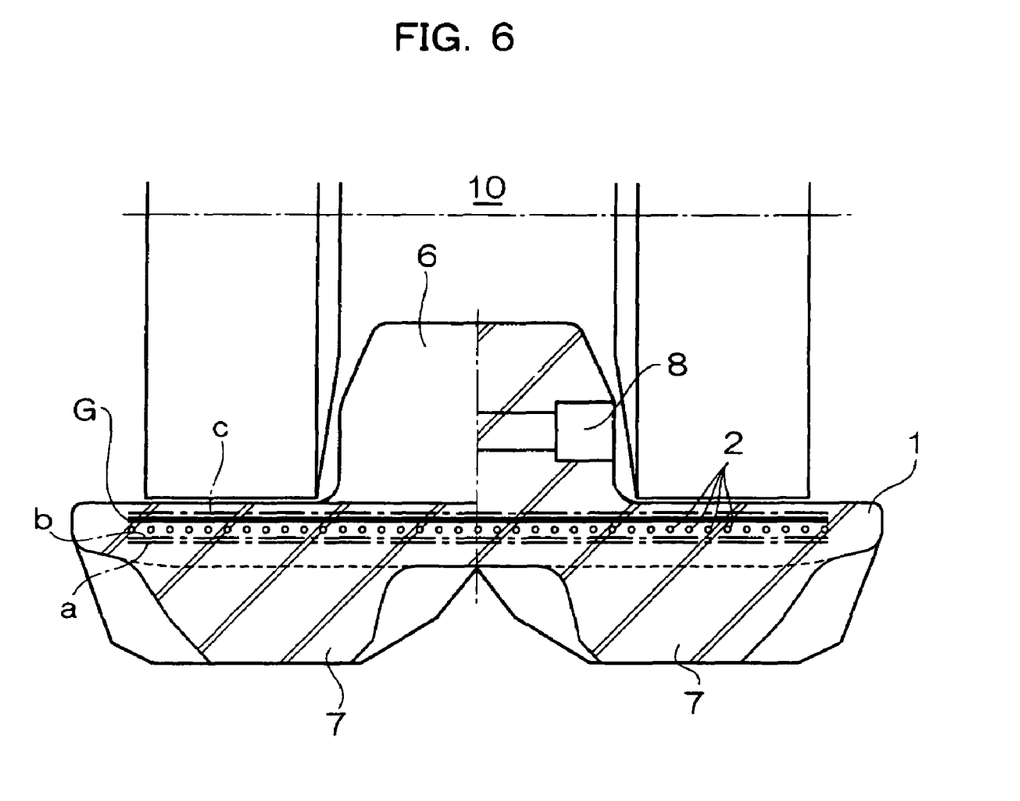
FIG. 6 is a cross-sectional view taken along line A-A of the crawler of FIG. 5.
Figure 7:
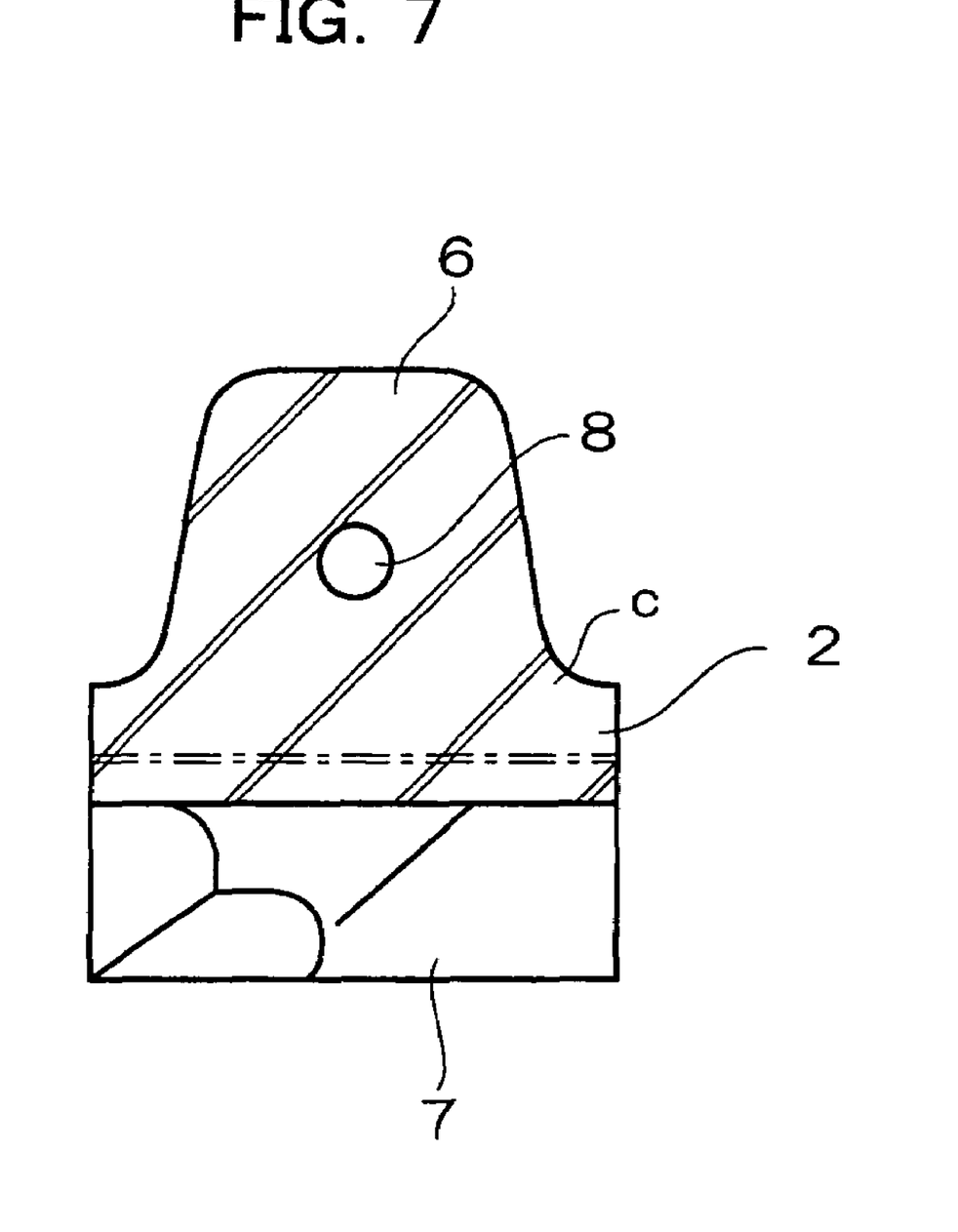
FIG. 7 is a cross-sectional view taken along line B-B of the crawler of FIG. 5.

FIG. 3 is a plan view of a crawler of an example of the present invention at an outer peripheral side thereof, FIG. 4 is a plan view of a crawler of an example of the present invention at an inner peripheral side thereof, FIG. 5 is a side view of a crawler in Example 1 of the present invention, FIG. 6 is a cross-sectional view taken along line A-A of the crawler of FIG. 5, and FIG. 7 is a cross-sectional view taken along line B-B of the crawler of FIG. 5. Main cords 2 are embedded in rows in a longitudinal-direction of a crawler 1, and two layers of bias cords (a, b) are embedded at an outer peripheral side of the main cords 2, and bias cords (c) are embedded at an inner peripheral side of the main cords 2. Then, rubber protrusions 6 are formed at constant intervals at a central portion on an inner peripheral surface of the crawler 1, and subject to driving forces from sprockets. Rubber lugs 7 are formed in an outer peripheral surface of the crawler 1. The bias cords (a, b) are layers of cords forming inversely angles at about 35 degrees with respect to the main cords 2. The bias cords (c) run perpendicular to the main cords 2, generally referred to as "cord angle 0 (zero)". It will be noted that the bias cords are steel cords formed in a blind state. A rubber layer G having rubber hardness of 60 degrees which will be described later is embedded between the bias cords (c) and the main cords 2.

Figure 8:
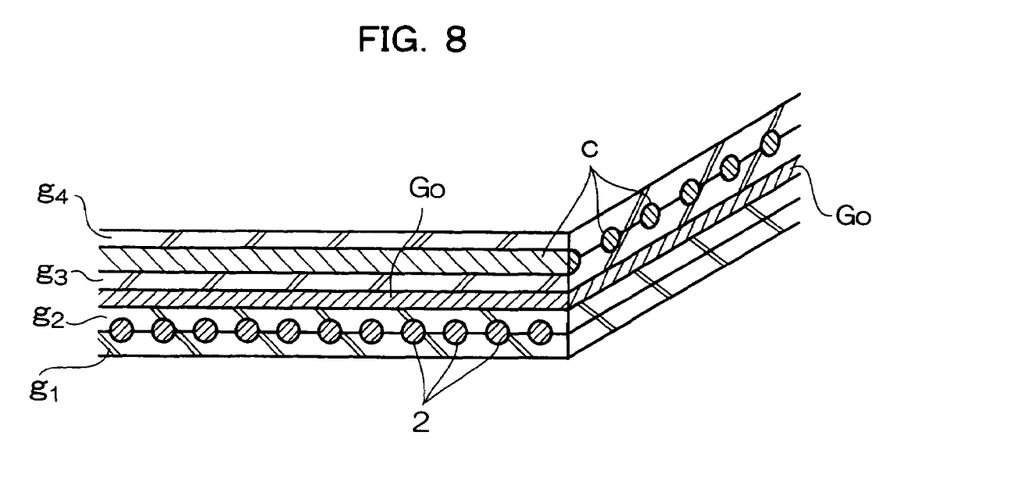
FIG. 8 is a detail view between the main cords and the bias cords (c) before vulcanized in the crawler of FIG. 5.

FIG. 8 is a detail view between the main cords 2 and the bias cords (c) of the crawler of the present example. The main cords 2 are held from above and below between unvulcanized rubbers (treatment rubbers) g1 and g2 and formed into a belt shape. The bias cords (c) are also held between unvulcanized rubbers (treatment rubbers) g3 and g4 to form a belt shape. An unvulcanized rubber G0 having lower hardness is held between both belts at an entire area in width direction of both belts. In this state, the rubbers are vulcanized.

Figure 9:
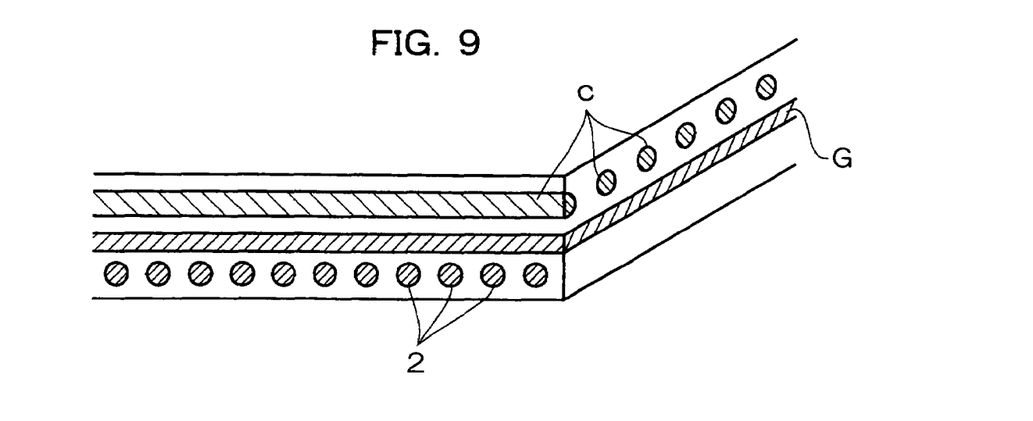
FIG. 9 is a detail view between the main cords and the bias cords (c) after vulcanized in the crawler of FIG. 5.

FIG. 9 shows a state after vulcanized. Rubber hardness of the rubber layer G is 60 degrees. The rubber layer G is interposed between the main cords 2 and the bias cords (c). The rubber layer G has substantially the same width as the bias cord (c). Then, when the unvulcanized rubbers (treatment rubbers) g1, g2, g3 and g4 surrounding the main cords 2 and the bias cords (c) are integrally vulcanized, rubber hardness thereof is 80 degrees.

In accordance with the crawler of an example of the present invention, when track rollers roll on left and right surfaces 1A and 1B of the rubber protrusions 6, strain is applied to the bias cords (c), especially shear strain is applied to portions corresponding to the edge portions of track rollers. The strain is applied to the bias cords (c) in high hardness rubbers with their behavior restricted. When this is repeated for many times, the bias cords (c) may be broken. On the other hand, in an example of the present invention, since lower hardness rubber is interposed between high hardness rubbers, strain is dispersed onto the crawler, and it is difficult for the strain to concentrate on one single portion. Accordingly, the occurrences of breakage of the bias cords (c) can be reduced.

Example 2

Figure 10:
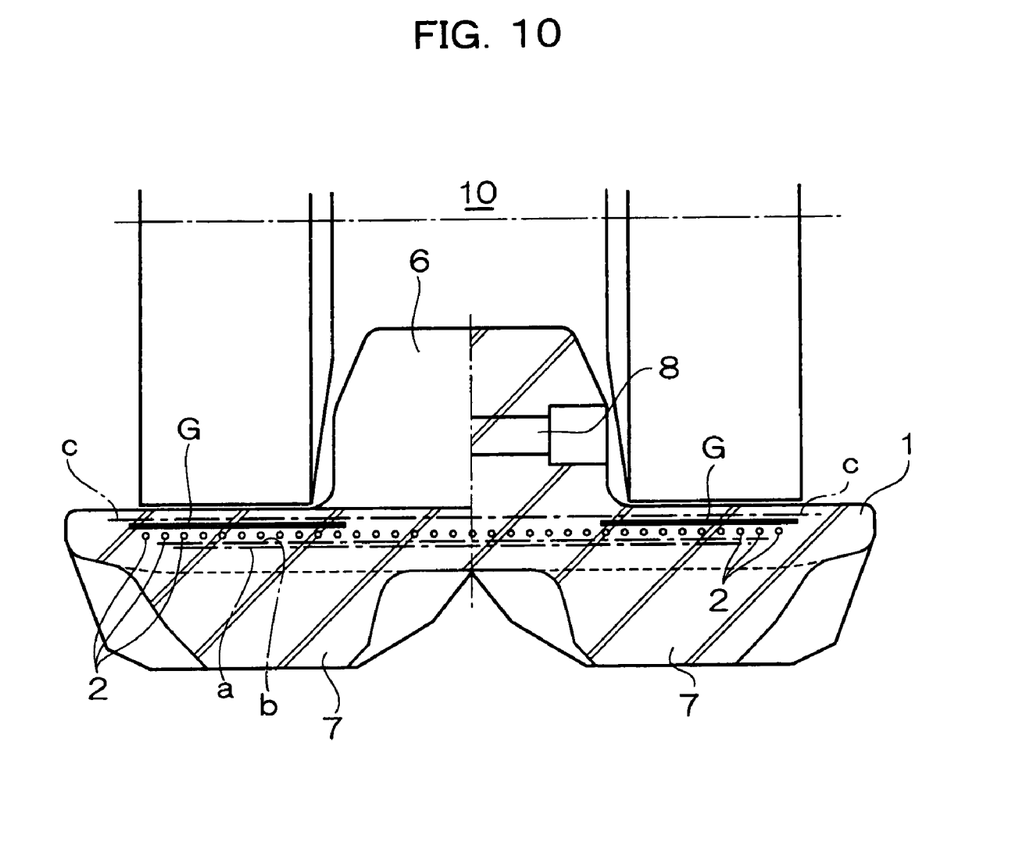
FIG. 10 is a cross-sectional view of a crawler in Example 2 of the present invention, as seen in the same manner as FIG. 6.

FIG. 10 is a cross-sectional view of a crawler in Example 2 of the present invention, as seen in the same manner as FIG. 6. In this example, a track roller 10 roll on the left and right width direction surfaces of the rubber protrusions 6. Low hardness rubber is interposed so as to be provided at rolling portions of the track roller 10, as seen from a plan view. Thus, the low hardness rubber is divided into the left and right rubber portions. Further, in order to prevent trim bending, the left and right end portions of each layer are gradually made shorter as it becomes closer to the outer periphery side of the crawler such that the left and right end portions of the crawler are gradually made softer. In this respect, as it is not shown, the left and right portions of each layer may be gradually made shorter as it becomes closer to the inner periphery side of the crawler.

INDUSTRIAL APPLICABILITY

As the present invention is structured as described above, a drawback of the bias cords being broken during the use of a crawler is thereby solved. Accordingly, the present invention can be broadly applicable to a coreless crawler.

DESCRIPTION OF THE REFERENCE NUMERALS

1: CRAWLER
1A, 1B: ROLLING SURFACES OF TRACK ROLLERS
2: MAIN CORDS
6: RUBBER PROTRUSIONS
7: RUBBER LUGS
10: TRACK ROLLER
c: BIAS CORDS EMBEDDED AT AN INNER PERIPHERAL SIDE OF MAIN CORDS
g1, g2: UNVULCANIZED RUBBER (TREATMENT RUBBER) HOLDING MAIN CORDS THEREBETWEEN
g3, g4: UNVULCANIZED RUBBER (TREATMENT RUBBER) HOLDING BIAS CORDS THEREBETWEEN
G: LOW HARDNESS RUBBER LAYER BETWEEN MAIN CORDS AND BIAS CORDS

The invention claimed is:

1. A structure of a coreless crawler comprising:
   main cords that are embedded in rows in a longitudinal direction of the crawler;

two layers of bias cords (a, b) that form inverse angles at left and right sides with respect to the main cords and are embedded at an outer peripheral side of the main cords;

bias cords (c) that are laid perpendicular to the main cords and embedded at an inner peripheral side of the main cords;

rubber protrusions that are formed at constant intervals at a central portion on an inner peripheral surface of the crawler; and rubber lugs that are formed on an outer peripheral surface of the crawler, wherein the bias cords (a, b, c) and the main cords are respectively held between treatment rubbers, and a rubber layer having lower hardness than the treatment rubbers is interposed between the main cords and the bias cords (c) so as to be provided at least at rolling surface portions of track rollers in left and right width directions of the rubber protrusions, as seen from a plan view of the crawler.

2. The structure of a coreless crawler according to claim 1, wherein the rubber layer having lower hardness is interposed between the main cords and the bias cords (c).

3. The structure of a coreless crawler according to claim 1, wherein the hardness of the rubber layer interposed between the main cords and the bias cords (c) is in a range of 55 to 70 degrees.

4. The structure of a coreless crawler according to claim 1, wherein end portions of the rubber layer having lower hardness, the bias cords (c), and the main cords are formed at different positions at both end portions in a width direction of the crawler.

5. The structure of a coreless crawler according to claim 1, wherein end portions of the rubber layer having lower hardness are positioned closer to the width direction center of the crawler than the end portions of the bias cords (c) at both end portions in a width direction of the crawler.

6. The structure of a coreless crawler according to claim 1, wherein end portion of the rubber layer having lower hardness are positioned closer to the width direction outer side of the crawler than the end portions of the main cords at both end portions in a width direction of the crawler.

* * * * *